United States Patent [19]

Shibata et al.

[11] Patent Number: 5,035,114
[45] Date of Patent: Jul. 30, 1991

[54] AIR SUPPLY CONTROL SYSTEMS FOR TURBOCHARGED INTERNAL COMBUSTION ENGINES

[75] Inventors: Masanori Shibata; Masaru Yamamoto; Haruo Okimoto; Seiji Tashima, all of Hiroshima, Japan

[73] Assignee: Mazda Motor Corporation, Hiroshima, Japan

[21] Appl. No.: 426,586

[22] Filed: Oct. 25, 1989

[30] Foreign Application Priority Data

Oct. 27, 1988 [JP] Japan .................................. 63-272525

[51] Int. Cl.⁵ .............................................. F02B 37/00
[52] U.S. Cl. ....................................................... 60/612
[58] Field of Search .................... 60/602, 612; 123/564

[56] References Cited

U.S. PATENT DOCUMENTS 4,781,027 11/1988 Richter et al. .................... 60/612 X

FOREIGN PATENT DOCUMENTS

| 334228 | 9/1989 | European Pat. Off. ............... 60/612 |
| 41417 | 4/1981 | Japan . |
| 160022 | 9/1984 | Japan . |
| 193023 | 8/1989 | Japan ..................................... 60/612 |
| 195921 | 8/1989 | Japan ..................................... 60/612 |
| 195922 | 8/1989 | Japan ..................................... 60/612 |

*Primary Examiner*—Michael Koczo
*Attorney, Agent, or Firm*—Sixbey, Friedman, Leedom & Ferguson

[57] ABSTRACT

An air supply control system for an internal combustion engine comprises a supercharging device operative to perform selectively a first supercharging operation by which supercharging efficiently under a first condition wherein the engine operates with relatively small intake air flow is improved and a second supercharging operation by which supercharging efficiency under a second condition wherein the engine operates with relatively large intake air flow is improved, an operation detector for detecting engine operations, a traveling condition detector for detecting traveling conditions to a vehicle equipped with the engine, a supercharging operation controller operative to cause the supercharging device to perform the first supercharging operation when a first engine operation attended with relatively small intake air flow is detected by the operation detector and to perform the second supercharging operation when a second engine operation attended with relatively large intake air flow is detected by the operation detector, and an operating area changer operative to vary, in accordance with traveling conditions detected by the traveling condition detector, a boundary between first and second operating areas provided on an operating characteristic chart of the engine for defining the first and second engine operations, respectively.

15 Claims, 7 Drawing Sheets

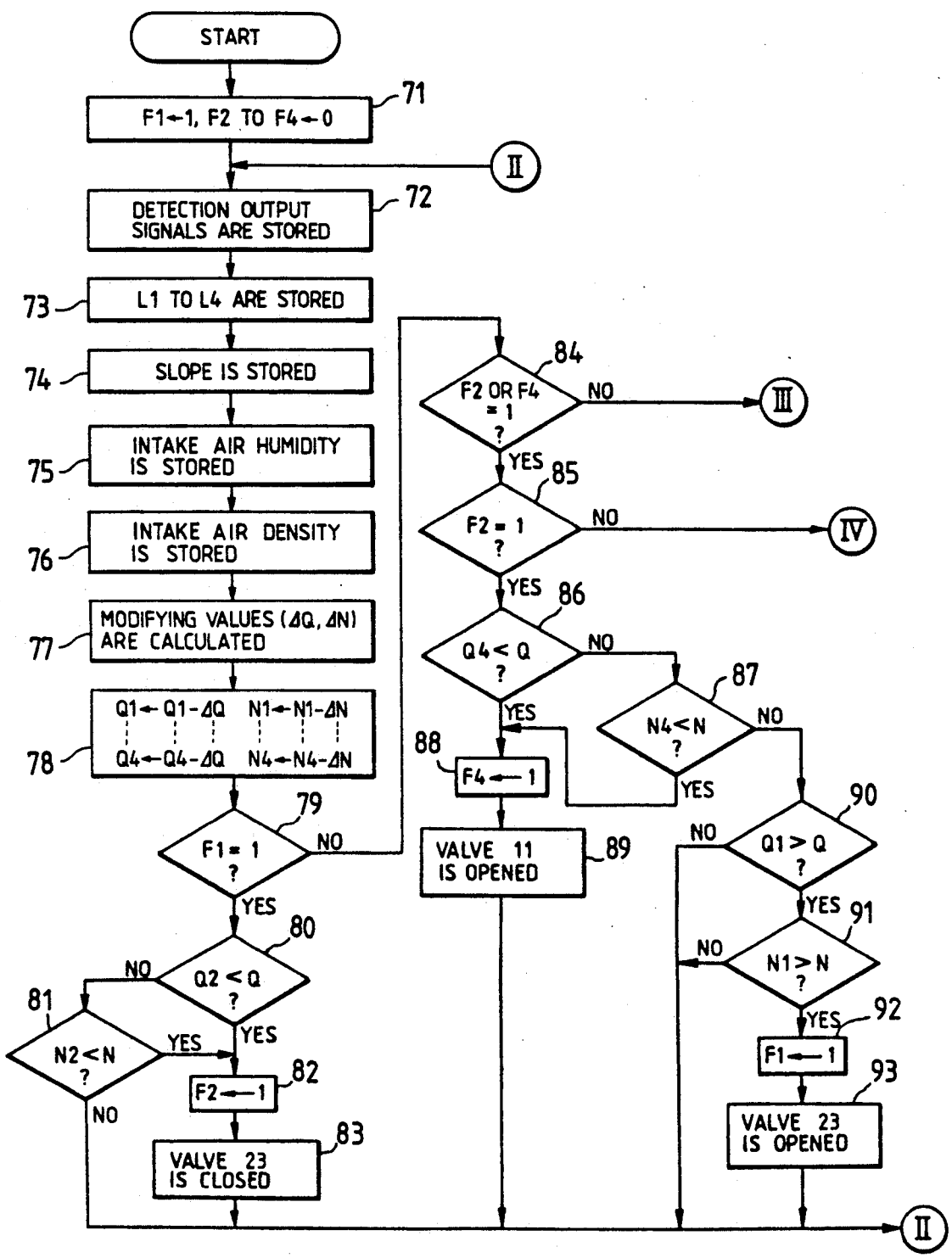
FIG. 4-a

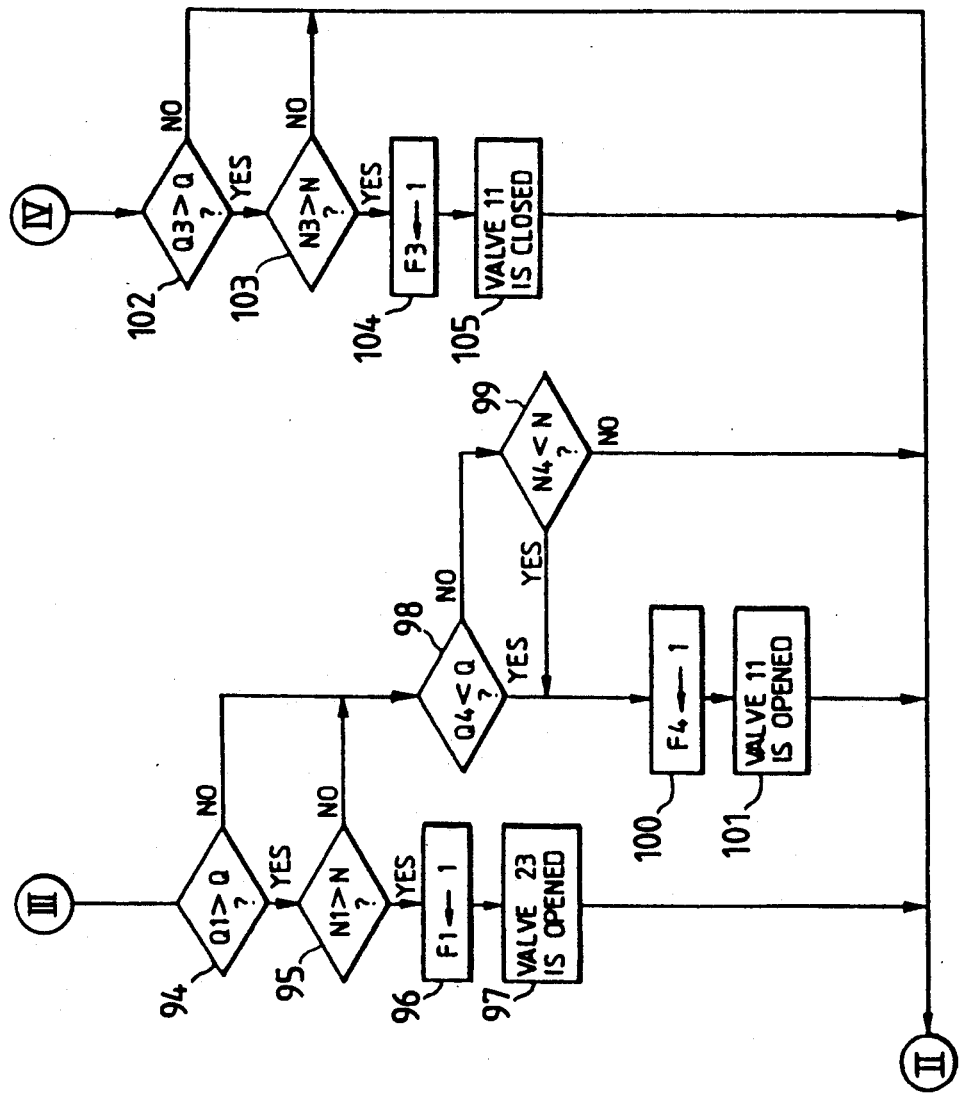
FIG. 4-b

AIR SUPPLY CONTROL SYSTEMS FOR TURBOCHARGED INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a supercharging device accompanying with the engine and operative to perform selectively a first supercharging operation by which supercharging efficiency under a first condition wherein the engine operates with relatively small intake air flow is improved and a second supercharging operation by which supercharging efficiency under a second condition wherein the engine operates with relatively large intake air flow is improved.

2. Description of the Prior Art

In an internal combustion engine equipped with a turbosupercharger, improved supercharging efficiency would not be expected under a situation wherein the engine is operating with relatively small intake air flow in the case where the turbosupercharger is arranged to be large in supercharging capacity and further under a situation wherein the engine is operating with relatively large intake air flow in the case where the turbosupercharger is arranged to be small in supercharging capacity.

In view of the above, there has been proposed to provide a couple of turbosuperchargers of primary and secondary to an internal combustion engine and to make only the primary turbosupercharger operate when intake air flow in an intake passage of the engine is relatively small and make both the primary and secondary turbosuperchargers operate simultaneously when the intake air flow is relatively large, as disclosed in, for example, Japanese patent applications published before examination under publication numbers 56-41417 and 59-160022, respectively, and Japanese utility model application published before examination under publication number 60-178329. In such a case, a combustion chamber in the engine can be supercharged with improved supercharging efficiency both on the occasion of engine operation with relatively small intake air flow and on the occasion of engine operation with relatively large intake air flow.

In connection with the internal combustion engine provided, as mentioned above, with the primary and secondary turbosuperchargers which are caused to work selectively so as to vary their supercharging capacity in accordance with operating conditions of the engine, first and second operating areas provided on an operating characteristic chart of the engine, which may be shown with an axis of abscissa representing engine speed and an axis of ordinate representing engine load embodied by, for example, opening degree of throttle int he engine, are predetermined respectively for a first supercharging condition in which only the primary turbosupercharger is to work and a second supercharging condition in which both the primary and secondary turbosuperchargers are to work simultaneously. (Hereinafter, the first and second operating areas will be referred to as P and S operating areas, respectively.) These P and S operating areas are generally determined with reference to a condition in which the engine operates with an appropriate temperature after having been warmed up sufficiently.

However, in the engine which is provided with the primary and secondary turbosuperchargers and for which the P and S operating areas are fixedly predetermined as mentioned above, there is a disadvantage that supercharging efficiency with which the combustion chamber in the engine is supercharged varies undesirably in accordance with variations of traveling conditions to a vehicle equipped with the engine, for example, variations in slope of a road surface on which the vehicle travels.

In more detail, for improving the supercharging efficiency correctly, the P operating area provided on the operating characteristic chart of the engine is desired to correspond always to a first actual supercharging condition in which improved supercharging efficiency is obtained through only the operation of the primary turbosupercharger and the S operating area provided on the operating characteristic chart of the engine is desired to correspond always to a second actual supercharging condition in which improved supercharging efficiency is obtained through both the operation of the first turbosupercharger and the operation of the second turbosupercharger. However, it is impossible that the P and S operating areas correspond always to the first and second actual supercharging conditions, respectively, while the vehicle travels on an actual road, because each of the first and second actual supercharging conditions is varied in accordance with variations in slope of the road surface of the actual road. Therefore, even though the P and S operating areas are correctly arranged to correspond respectively to the first and second actual supercharging conditions so that improved supercharging efficiency is obtained when the vehicle travels on, for example, a flat road, each of the P and S operating areas does not correspond to the first or second actual supercharging condition and thereby improved supercharging efficiency is not obtained when the vehicle travels on an ascending or descending road.

Further, in the engine which is provided with the primary and secondary turbosuperchargers and for which the P and S operating areas are fixedly predetermined, the supercharging efficiency with which the combustion chamber in the engine is supercharged varies undesirably also in accordance with variations in intake air humidity or intake air density in the engine.

OBJECTS AND SUMMARY OF THE INVENTION

Accordingly, it is an object of the present invention to provide an air supply control system for an internal combustion engine provided with a supercharging device operative to perform selectively a first supercharging operation by which supercharging efficiency under a first condition wherein the engine operates with relatively small intake air flow is improved and a second supercharging operation by which supercharging efficiency under a second condition wherein the engine operates with relatively large intake air flow is improved, which avoids the foregoing disadvantages and problems encountered with the prior art.

Another object of the invention is to provide an air supply control system for an internal combustion engine provided with a supercharging device operative to perform selectively a first supercharging operation by which supercharging efficiency under a first condition wherein the engine operates with relatively small intake air flow is improved and a second supercharging operation by which supercharging efficiency under a second condition wherein the engine operates with relatively large intake air flow is improved, by which improved supercharging efficiency is maintained regardless of variations in traveling conditions to a vehicle equipped with the engine, such as variations in slope of a road surface on which the vehicle travels, variations in intake air humidity in the engine, or variations in intake air density in the engine.

A further object of the invention is to provide an air supply control system for an internal combustion engine provided with a plurality of turbosuperchargers operative to work with different supercharging capacities respectively in a first condition wherein the engine operates with relatively small intake air flow and a second condition wherein the engine operates with relatively large intake air flow so as to improve supercharging efficiency, by which improved supercharging efficiency is maintained regardless of variations in traveling conditions to a vehicle equipped with the engine, such as variations in slope of a road surface on which the vehicle travels, variations in intake air humidity in the engine, or variations in intake air density in the engine.

According to the present invention, there is provided an air supply control system for an internal combustion engine comprising a supercharging device provided for supercharging the engine and operative to perform selectively a first supercharging operation by which supercharging efficiency under a first condition wherein the engine operates with relatively small intake air flow is improved and a second supercharging operation by which supercharging efficiency under a second condition wherein the engine operates with relatively large intake air flow is improved, an operation detector for detecting engine operations, a traveling condition detector for detecting traveling conditions to a vehicle equipped with the engine, supercharging operation control means operative to cause the supercharging device to perform the first supercharging operation when a first engine operation attended with relatively small intake air flow is detected by the operation detector and to perform the second supercharging operation when a second engine operation attended with relatively large intake air flow is detected by the operation detector, and operating area changing means operative to vary, in accordance with traveling conditions detected by the traveling condition detector, a boundary between first and second operating areas provided on an operating characteristic chart of the engine for defining the first and second engine operations, respectively.

In an embodiment of air supply control system for an internal combustion engine according to the present invention, a supercharging device comprises first and second superchargers operative to be selectively situated in a first supercharging condition wherein only the first supercharger works for performing the first supercharging operation and in a second supercharging condition wherein both the first and second superchargers works simultaneously for performing the second supercharging operation, the supercharging operation control means is operative to cause only the first supercharger to work when the first engine operation is detected by the operation detector and to cause both the first and second superchargers to work simultaneously when the second engine operation is detected by the operation detector, the traveling condition detector is arranged to detect at least one of slope of a road surface on which the vehicle travels, intake air humidity in the engine and intake air density in the engine, and the operating area changing means operative to vary the boundary between first and second operating areas in accordance with at least one of slope of the road surface, intake air humidity and intake air density detected by the traveling condition detector.

In the air supply control system thus constituted in accordance with the present invention, the boundary between the first and second operating areas provided on the operating characteristic chart of the engine for defining respectively the first and second engine operations is varied to extend or narrow the first area in accordance with the traveling condition to the vehicle, which is embodied by, for example, at least one of slope of the road surface on which the vehicle travels, intake air humidity in the engine and intake air density in the engine, and thereby the supercharging device is caused to perform the first supercharging operation in response to the first engine operation and to perform the second supercharging operation in response to the second engine operation so that improved supercharging efficiency is maintained regardless of variations in the traveling condition to the vehicle, such as variations in slope of the road surface on which the vehicle travels, variations in intake air humidity in the engine or variations in intake air density in the engine.

The above, and other objects, features and advantages of the present invention will become apparent from the following detailed description which is to be read in conjunction with the accompanying drawings.

BRIEF DESCRIPTION OF THE DRAWINGS

FIGS. 4-a and 4-b show a flow chart used for explaining the operation of the embodiment shown in FIG. 2.

DESCRIPTION OF THE PREFERRED EMBODIMENT

Figure 1:
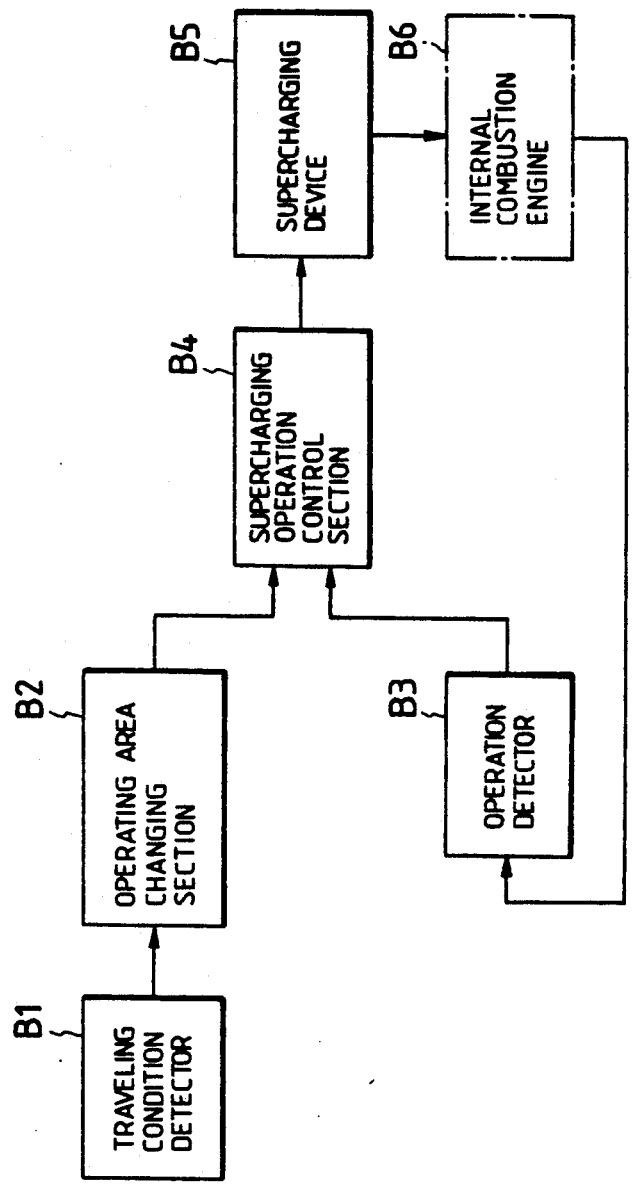
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises a traveling condition detector B1, an operating area changing section B2, an operation detector B3, a supercharging operation control section B4, and a supercharging device B5, and the supercharging device B5 is connected with an internal combustion engine B6 to which the system is applied.

The supercharging device B5 is provided for supercharging the internal combustion engine B6 and operative to perform selectively a first supercharging operation by which supercharging efficiency under a first condition wherein the internal combustion engine B6 operates with relatively small intake air flow is improved and a second supercharging operation by which supercharging efficiency under a second condition wherein the internal combustion engine B6 operates with relatively large intake air flow is improved. The operation detector B3 is operative to detect operations of the internal combustion engine B6. The supercharging operation control section B4 is operative to cause the supercharging device to perform the first supercharging operation when a first engine operation attended with relatively small intake air flow is detected by the operation detector B3 and to perform the second supercharging operation when a second engine operation attended with relatively large intake air flow is detected by the operation detector B3. The traveling condition detector B1 is operative to detect traveling conditions to a vehicle equipped with the internal combustion engine B6, such as at least one of slope of a road surface on which the vehicle travels, intake air humidity in the internal combustion engine B6 and intake air density in the internal combustion engine B6. The operating area changing section B2 is operative to vary, in accordance with the traveling condition detected by the traveling condition detector B1, a boundary between first and second operating areas provided on an operating characteristic chart of the engine for defining the first and second engine operations, respectively.

Figure 2:
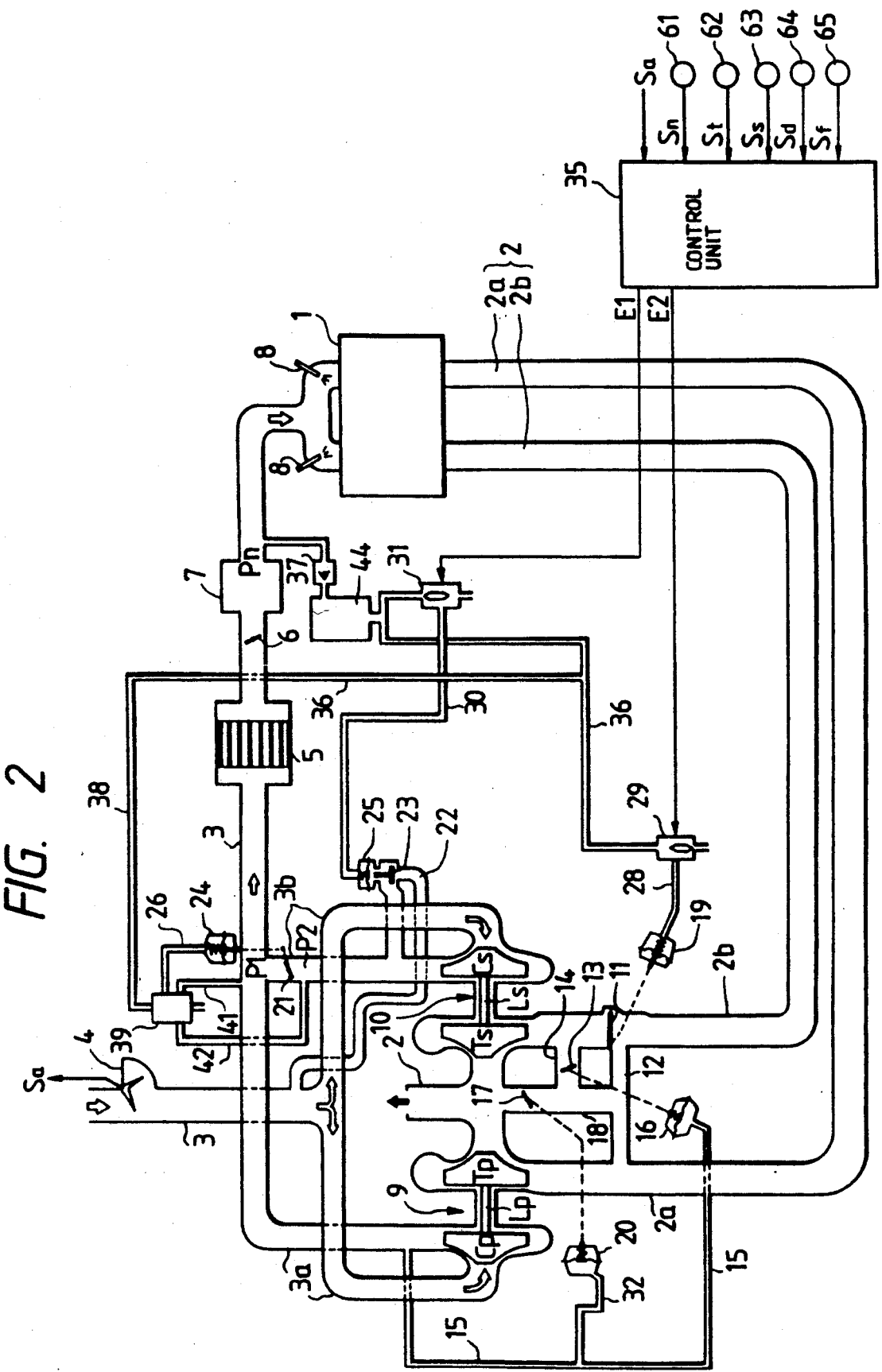
FIG. 2 is a schematic illustration showing an embodiment of air supply control system for an internal combustion engine according to the present invention, together with essential parts of an engine to which the embodiment is applied.

FIG. 2 illustrates an embodiment of air supply control system according to the present invention, together with a part of an engine to which the embodiment is applied.

Referring to FIG. 2, an internal combustion engine 1, which is, for example, a rotary engine having a couple of rotors each forming an operating chamber having the capacity of, for example, 654 cubic centimeters, is provided with an exhaust passage 2 for discharging exhaust gas from the engine 1 and an intake passage 3 for supplying the engine 1 with intake air. The exhaust passage 2 includes first and second separated exhaust passages 2a and 2b, and the intake passage 3 includes first and second branched intake passages 3a and 3b which are separated from each other at a location downstream of an air flow sensor 4 provided for detecting intake air flow in the intake passage 3 and merged into each other at a location upstream of an intercooler 5 provided for cooling the intake air in the intake passage 3. A portion of the intake passage 3 downstream of the intercooler 5 is provided with a throttle valve 6, a surge chamber 7 and fuel injectors 8.

A primary turbosupercharger 9 is provided with a turbine Tp disposed in the first separated exhaust passage 2a to be driven to rotate by the exhaust gas and a blower Cp disposed in the first branched intake passage 3a and coupled through a rotating shaft Lp with the turbine Tp. A secondary turbosupercharger 10 is also provided with a turbine Ts disposed in the second separated exhaust passage 2b to be driven to rotate by the exhaust gas and a blower Cs disposed in the second branched intake passage 3b and coupled through a rotating shaft Ls with the turbine Ts.

The primary turbosupercharger 9 is provided with supercharging capacity so selected that supercharging efficiency under a condition wherein the engine 1 operates with relatively small intake air flow is improved when only the primary turbosupercharger 9 works for supercharging the engine 1, and the secondary turbosupercharger 10 is provided with supercharging capacity so selected that supercharging efficiency under a condition wherein the engine 1 operates with relatively large intake air flow is improved when both the primary and secondary turbosuperchargers 9 and 10 work simultaneously for supercharging the engine 1.

A portion of the first branched intake passage 3a upstream of the blower Cp and a portion of the second branched intake passage 3b upstream of the blower Cs are arranged in a line to form a branched portion, so that pressure waves produced in one of the first and second branched intake passages 3a and 3b are easy to propagate to the other of the first and second branched intake passages 3a and 3b but hard to propagate toward the air flow sensor 4.

An exhaust cutoff valve 11 is disposed in a portion of the second separated exhaust passage 2b upstream of the turbine Ts. This exhaust cutoff valve 11 is operative to close the second separated exhaust passage 2b in order to prevent the exhaust gas from being supplied to the turbine Ts so that only the primary turbosupercharger 9 works in a situation where intake air flow supplied to the engine 1 is relatively small.

A portion of the second separated exhaust passage 2b upstream of the exhaust cutoff valve 11 is connected through a connecting passage 12 with a portion of the first separated exhaust passage 2a upstream of the turbine Tp. The connecting passage 12 is also connected with a portion of the exhaust passage 2 downstream of the turbines Tp and Ts through a bypass passage 18 in which a waste gate valve (WGV) 17 is provided. A portion of the bypass passage 18 upstream of the waste gate valve 17 is connected with a portion of the second separated exhaust passage 2b between the exhaust cutoff valve 11 and the turbine Ts through an exhaust bypass passage 14 in which an exhaust bypass valve 13 is provided.

The exhaust cutoff valve 11 is driven by a diaphragm actuator 19, and the exhaust bypass valve 13 and the waste gate valve 17 are driven by diaphragm actuators 16 and 20, respectively. A pressure chamber of the diaphragm actuator 16 is coupled through a control pressure pipe 15 with a portion of the first branched intake passage 3a downstream of the blower Cp and a pressure chamber of the diaphragm actuator 20 is coupled through a control pressure pipe 32 and the control pressure pipe 15 with the portion of the first branched intakent passage 3a downstream of the blower Cp.

An intake air cutoff valve 21 is disposed in a portion of the second branched intake passage 3b downstream of the blower Cs. The second branched intake passage 3b is provided also with an intake air relief passage 22 detouring the turbine Ts and having therein an intake air relief valve 23. The intake air cutoff valve 21 is driven by a diaphragm actuator 24, and the intake air relief valve 23 is driven by a diaphragm actuator 25.

A control pressure pipe 26 extending from the diaphragm actuator 24 for driving the intake air cutoff valve 21 is connected with an output port of a pressure difference detecting valve 39. Further, a control pressure pipe 28 extending from the diaphragm actuator 19 for driving the exhaust cutoff valve 11 is connected with an output port of a three-way solenoid valve 29, and a control pressure pipe 30 extending from the diaphragm actuator 25 for driving the intake air relief valve 23 is connected with an output port of a three-way solenoid valve 31.

One of input ports of the three-way solenoid valve 29 is open to the atmosphere and the other of the input ports is connected through a pipe 36 with a negative pressure tank 44 to which a negative pressure Pn obtained at a portion downstream of the throttle valve 6 in the intake passage 3 is supplied through a check valve 37, and one of input ports of the three-way solenoid valve 31 is open to the atmosphere and the other of the input ports is connected with the negative pressure tank 44. Further, the pressure difference detecting valve 39 is also connected through a pipe 38 and the the pipe 36 with the negative pressure tank 44.

The pressure difference detecting valve 39 has a first input port connected through a pipe 41 with the portion of the first branched intake passage 3a downstream of the blower Cp so as to be supplied with an air pressure P1, a second input port connected through a pipe 42 with a portion of the second branched intake passage 3b upstream of the intake air cutoff valve 21 so as to be supplied with an air pressure P2 at a portion upstream of the intake air cutoff valve 21 in the second branched intake passage 3b and a third input port opened to the atmosphere. This pressure difference detecting valve 39 is operative to apply the negative pressure Pn from the negative pressure tank 44 to the diaphragm actuator 24 so that the intake air cutoff valve 21 is closed when the pressure difference between the air pressures P1 and P2 is larger than a predetermined pressure value $\Delta P$ and to cause the diaphragm actuator 24 to open the atmosphere so that the intake air cutoff valve 21 is opened when the pressure difference between the air pressures P1 and P2 is equal to or smaller than the predetermined pressure value $\Delta P$.

The three-way solenoid valves 29 and 31 are controlled by a control unit 35 constituted by a microcomputer.

The control unit 35 is provided with detection output signals Sa, Sn, St, Ss, Sd and Sf obtained from the air flow sensor 4, from an engine speed sensor 61 for detecting the speed of the engine 1 (engine speed), from a throttle sensor 62 for detecting opening degree of the throttle valve 6 (opening degree of throttle), from a slope sensor 63 for detecting slope of a road surface on which a vehicle equipped with the engine 1 travels, from a density sensor 64 for detecting intake air density in the intake passage 3, and from a humidity sensor 65 for detecting intake air humidity in the intake passage 3, respectively, and operative to produce control signals E1 and E2 selectively based on the detection output signals Sa, Sn, St, Ss, Sd and Sf and to supply the three-way solenoid valve 31 with the control signal E1 and the three-way solenoid valve 29 with the control signal E2.

When the control pressure pipe 30 is communicated with the negative pressure tank 44 through the three-way solenoid valve 31 controlled by the control signal E1, the negative pressure Pn is applied to the diaphragm actuator 25 and thereby the intake air relief valve 23 is opened. On the other hand, when the control pressure pipe 30 is opened to the atmosphere through the three-way solenoid valve 31 controlled by the control signal E1, the diaphragm actuator 25 is opened to the atmosphere and thereby the intake air relief valve 23 is closed.

When the control pressure pipe 28 is communicated with the pipe 36 through the three-way solenoid valve 29 controlled by the control signal E2, the negative pressure Pn is applied to the diaphragm actuator 19 and thereby the exhaust cutoff valve 11 is closed, so that only the primary turbosupercharger 9 is caused to work. On the other hand, when the control pressure pipe 28 is opened to the atmosphere through the three-way solenoid valve 29 controlled by the control signal E2, the diaphragm actuator 19 is opened to the atmosphere and thereby the exhaust cutoff valve 11 is opened, so that the secondary turbosupercharger 10 is caused to work.

Figure 3:
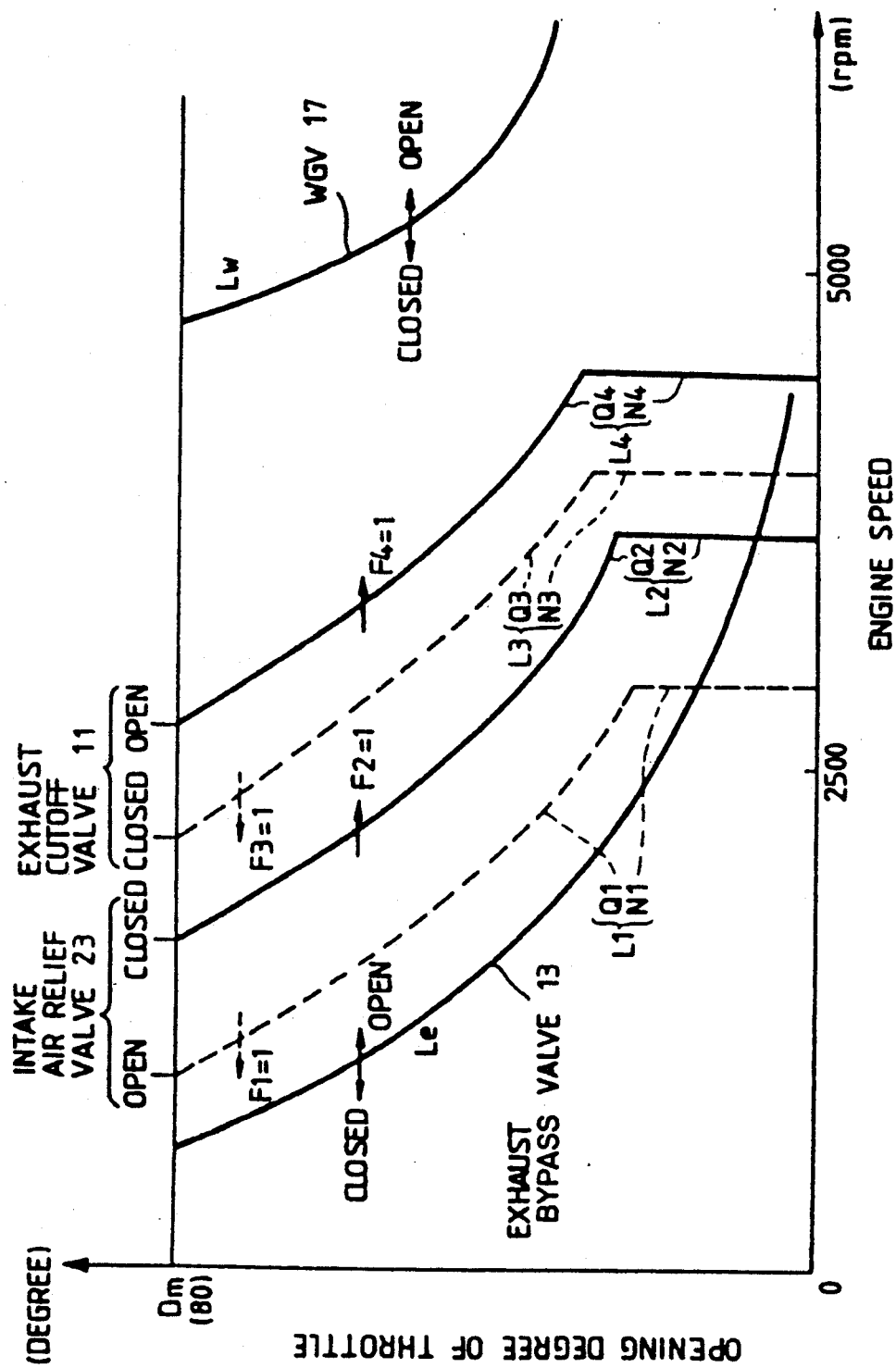
FIG. 3 is a characteristic chart used for explaining the operation of various valves employed in the embodiment shown in FIG. 2.

FIG. 3 is a characteristic chart showing the operating conditions of the exhaust cutoff valve 11, exhaust bypass valve 13, waste gate valve (WGV) 17 and intake air relief valve 23. This characteristic chart of FIG. 3 has an axis of abscissa representing engine speed and an axis of ordinate representing engine load embodied by opening degree of throttle, the maximum value of which is indicated by Dm, and is stored in the form of data map in a memory contained in the control unit 35.

According to the characteristic chart of FIG. 3, the waste gate valve 17 is changed to be open from closed and to be closed from open in accordance with a line Lw in common, and the exhaust bypass valve 13 is changed to be open from closed and to be closed from open in accordance with a line Le in common. On the other hand, the intake air relief valve 23 is changed to be open from closed in accordance with a line L1 which indicates the operating condition of engine in which the engine 1 operates with intake air flow Q1 and the operating condition of engine in which the engine 1 operates at engine speed N1 and to be closed from open in accordance with a line L2 which indicates the operating condition of engine in which the engine 1 operates with intake air flow Q2 and the operating condition of engine in which the engine 1 operates at engine speed N2, and the exhaust cutoff valve 11 is changed to be closed from open in accordance with a line L3 which indicates the operating condition of engine in which the engine 1 operates with intake air flow Q3 and the operating condition of engine in which the engine 1 operates at engine speed N3 and to be open from closed in accordance with a line L4 which indicates the operating condition of engine in which the engine 1 operates with intake air flow Q4 and the operating condition of engine in which the engine 1 operates at engine speed N4.

In the case where the engine speed is relatively low, the negative pressure Pn is applied through the three-way solenoid valve 31 and the control pressure pipe 30 to the diaphragm actuator 25 and whereby the intake air relief valve 23 keeps the intake air relief passage 22 open. Then, the three-way solenoid valve 31 is changed to open the control pressure pipe 30 to the atmosphere by the control signal E1 from the control unit 35, so that the intake air relief valve 23 shuts the intake air relief passage 22, before the exhaust cutoff valve 11 are opened during the period of time in which the engine speed is increasing, as shown in FIG. 3.

On the characteristic chart of FIG. 3, an operating area having the line L4 as a lower boundary is set to define an operation of the engine 1 attended with relatively large intake air flow and therefore the operating area having the line L4 as a lower boundary corresponds to an operating condition of the engine 1 in which intake air flow fed to the combustion chambers formed in the engine 1 is to be relatively large, and each of an operating area between the lines L2 and L4 and an operating area having the line L2 as an upper boundary is set to define an operation of the engine 1 attended with relatively small intake air flow and therefore each of the operating area between the lines L2 and L4 and the operating area having the line L2 as an upper boundary corresponds to an operating condition of the engine 1 in which intake air flow fed to the combustion chambers formed in the engine 1 is to be relatively small.

When the operating condition of the engine 1 resides in the operating area having the line L2 as an upper boundary, the control unit 35 is operative to keep the exhaust cutoff valves 11 closed and, contrary, the intake air relief valve 23 open, so that the engine 1 is supercharged by only the primary turbosupercharger 9. Then, when the intake air flow or the engine speed has increased to cross the line L2 and the operating condition of the engine 1 has moved into the operating area between the lines L2 and L4, the control unit 35 is operative to close the intake air relief valve 23. In process of this, before the intake air relief valve 23 is closed, the exhaust bypass valve 13 is opened when the intake air flow has increased to cross the line Le and thereby the exhaust gas is supplied slightly to the turbine Ts of the secondary turbosupercharger 10 through the exhaust bypass passage 14 under a condition in which the intake air relief valve 23 is open. This results in that the turbine Ts is driven to rotate by the exhaust gas flowing through the exhaust bypass passage 14 so that the secondary turbosupercharger 10 is subjected to its preliminary rotation before the exhaust cutoff valve 11 is opened.

After that, when the intake air flow or the engine speed has further increased to cross the line L4 and the operating condition of the engine 1 has moved into the operating area having the line L4 as a lower boundary, the control unit 35 is operative to open the exhaust cutoff valve 11, so that the turbine Ts of the secondary turbosupercharger 10 is driven to rotate by the exhaust gas passing through the second separated exhaust passages 2b. With the operation of the secondary turbosupercharger 10, the pressure difference between the air pressures P1 and P2 is reduced to be equal to or smaller than the predetermined pressure value $\Delta P$ and thereby the intake air cutoff valve 21 is opened. Consequently, the engine 1 is supercharged by both the primary turbosupercharger 9 working with the turbine Tp driven to rotate by the exhaust gas passing through the first separated exhaust passage 2a and the secondary turbosupercharger 10 working with the turbine Ts driven to rotate by the exhaust gas passing through the second separated exhaust passage 2b.

As described above, since the secondary turbosupercharger 10 is rotated preliminarily by the exhaust gas supplied thereto through the exhaust bypass valve 13 under the condition in which the intake air relief valve 23 is open before it commences to work for supercharging the engine 1 and the intake air relief valve 23 is closed before the exhaust cutoff valve 11 is opened, the secondary turbosupercharger 10 under the sufficiently high preliminary rotation commences to work for supercharging the engine 1, and consequently, the response in supercharging by the secondary turbosupercharger 10 is improved and torque shock arising on the engine 1 is surely suppressed when the secondary turbosupercharger 10 commences to work for supercharging the engine 1.

Line L3 and line4 are differentiated from one another so as to have a hysteresis between them by setting $Q_2$ being greater than $Q_1$ $N_2$ greater than $N_1$, therefore after the operating condition of the engine 1 comes into the operating area having the line L4 as a lower boundary, when the operating condition of the engine 1 resides in an operating area having the line L3 as a lower boundary, the control unit 35 is operative to keep the exhaust cutoff valve 11 open and, contrary, the intake air relief valve 23 closed, so that the engine 1 is still supercharged by both the primary and secondary turbosuperchargers 9 and 10. Then, when the intake air flow or the engine speed has decreased to cross the line L3 and the operating condition of the engine 1 has moved into an operating area between the line L3 and the line L1, the control unit 35 is operative to close the exhaust cutoff valve 11, so that the exhaust gas passing through the second separated exhaust passage 2b is ceased to be directly supplied to the turbine Ts of the secondary turbosupercharger 10. Then, when the intake air flow or the engine speed has further decreased to cross the line L1 and the operating condition of the engine 1 has moved into an operating area having the line L1 as an upper boundary, the control unit 35 is operative to open the intake air relief valve 23.

Further, after the intake air relief valve 23 is opened, the exhaust bypass valve 13 is closed when the intake air flow or the engine speed has still further decreased to cross the line Le and thereby the exhaust gas is ceased to be supplied slightly to the turbine Ts of the secondary turbosupercharger 10 through the exhaust bypass passage 14. This results in that the turbine Ts is not driven to rotate by the exhaust gas so that the secondary turbosupercharger 10 is caused to stop working and the engine 1 is supercharged by only the primary turbosupercharger 9.

In the embodiment thus operating, the control unit 35 is operative to shift the lines L1 to L4 on the characteristic chart of FIG. 3 for varying a boundary between the operating area on the characteristic chart of FIG. 3 corresponding to the operating condition of the engine 1 wherein the engine 1 is to be supercharged by both the primary and secondary turbosuperchargers 9 and 10, which is referred to as a two-charger operating area hereinafter, and the operating area on the characteristic chart of FIG. 3 corresponding to the operating condition of the engine 1 wherein the engine 1 is to be supercharged by only the primary turbosupercharger 9, which is referred to as a single-charger operating area hereinafter, in accordance with traveling conditions embodied by slope of the road surface detected by the slope sensor 63, intake air density detected by the density sensor 64 and intake air humidity detected by the humidity sensor 65, so that improved supercharging efficiency is maintained regardless of variations in the traveling condition to the vehicle, that is, variations in the slope of the road surface detected by the slope sensor 63, variations in the intake air density detected by the density sensor 64, or variations in the intake air humidity detected by the humidity sensor 65.

In the change of the operation areas on the characteristic chart of FIG. 3 as mentioned above, for example, the boundary between the two-charger operating area and the single-charger operating area is varied to extend the single-charger operating area toward operating areas of larger opening degree of throttle and higher engine speed when the slope of the road surface detected by the slope sensor 63 is a descent larger in absolute value than a predetermined reference descent and further varied to extend the two-charger operating area toward operating areas of smaller opening degree of throttle and lower engine speed when the slope of the road surface detected by the slope sensor 63 is an ascent larger in absolute value than a predetermined reference ascent, the intake air density detected by the density sensor 64 is lower than a predetermined reference value, or the intake air humidity detected by the humidity sensor 65 is lower than a predetermined reference value.

With such shift of the boundary between the two-charger operating area and the single-charger operating area, the engine 1 is supercharged by only the primary turbosupercharger 9 until the intake air flow becomes relatively large or the engine speed becomes relatively high when the vehicle travels on a descent of relatively large slope and thereby the engine 1 is easily accelerated. On the other hand, the engine 1 is supercharged by both the primary and secondary turbosuperchargers 9 and 10 until the intake air flow becomes relatively small or the engine speed becomes relatively low when the vehicle travels on a ascent of relatively large slope and thereby the engine is easily decelerated, the intake air density in the intake passage 3 is relatively low and therefore it is hard to increase intake air flow supplied to the combustion chamber in the engine 1, or the intake air humidity in the intake passage 3 is relatively low and therefore knocking is apt to arise in the engine 1.

One example of an operation program for controlling the exhaust cutoff valve 11 and intake air relief valve 23 in such a manner as described above is carried out in the control unit 35 in accordance with a flow chart shown in FIGS. 4-a and 4-b.

According to the flow chart shown in FIGS. 4-a and 4-b, first, in step 71, an initial arrangement for setting a flag F1 to be 1 and setting each of the flags F2 to F4 to 0 is conducted. As shown in FIG. 3, after the initial arrangement, the flag F1 is set to be 1 and each of the flags F2 to F4 is set to be 0 when the intake air flow or the engine speed is decreased to cross the line L1, the flag F2 is set to be 1 and each of the flags F1, F3 and F4 is set to be 0 when the intake air flow or the engine speed is increased to cross the line L2 the flag F3 is set to be 1 and each of the flags F1, F2 and F4 is set to be 0 when the intake air flow or the engine speed is decreased to cross the line L3, the flag F4 is set to be 1 and each of the flags F1 to F3 is set to be 0 when the intake air flow or the engine speed is increased to cross the line L4.

Then, in step 72, the detection output signals Sa, Sn, St, Ss, Sd and Sf obtained from the air flow sensor 4, the engine speed sensor 61, the throttle sensor 62, the slope sensor 63, the density sensor 64 and the humidity sensor 65, respectively, are stored. Further, the intake air mass flow Q1 and the engine speed N1 representing the line L1, the intake air mass flow Q2 and the engine speed N2 representing the line L2, the intake air mass flow Q3 and the engine speed N3 representing the line L3, and the intake air mass flow Q4 and the engine speed N4 representing the line L4 are stored, in step 73.

After that, slope of the road surface is stored based on the detection output signal Ss from the slope sensor 63, in step 74, intake air humidity in the intake passage 3 is stored based on the detection output signal Sf from the humidity sensor 65, in step 75, and intake air density in the intake passage 3 is stored based on the detection output signal Sd from the density sensor 64, in step 76. Then, in step 77, a modifying value $\Delta Q$ for intake air flow and a modifying value $\Delta N$ for engine speed are calculated.

In the calculation of the modifying values $\Delta Q$ and $\Delta N$, first, modifying value components $\Delta Qa$, $\Delta Qb$ and $\Delta Qc$ for intake air flow are obtained based on the slope of the road surface stored in the step 74, the intake air humidity stored in the step 75, and the intake air density stored in the step 76, respectively, and modifying value components $\Delta Na$, $\Delta Nb$ and $\Delta Nc$ for engine speed are obtained based on the slope of the road surface stored in the step 74, the intake air humidity stored in the step 75, and the intake air density stored in the step 76, respectively.

Figure 5:
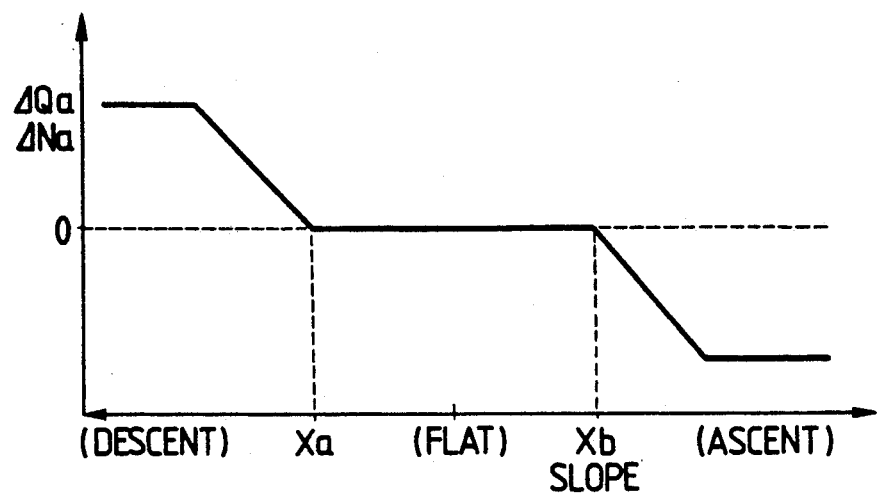
FIGS. 5 to 9 are characteristic charts used for explaining the operation of the embodiment shown in FIG. 2.
Figure 6:
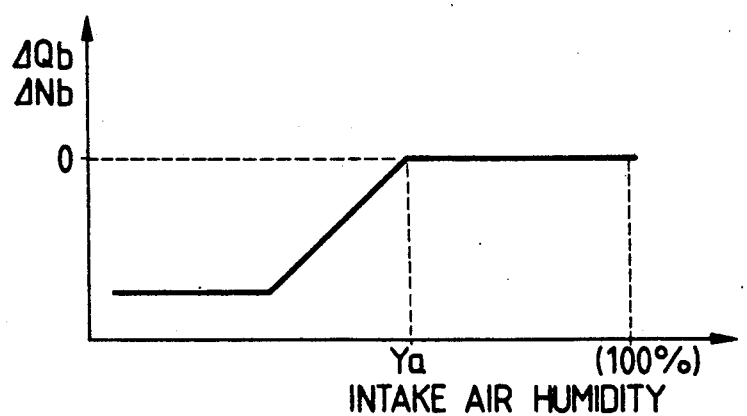
Figure 7:
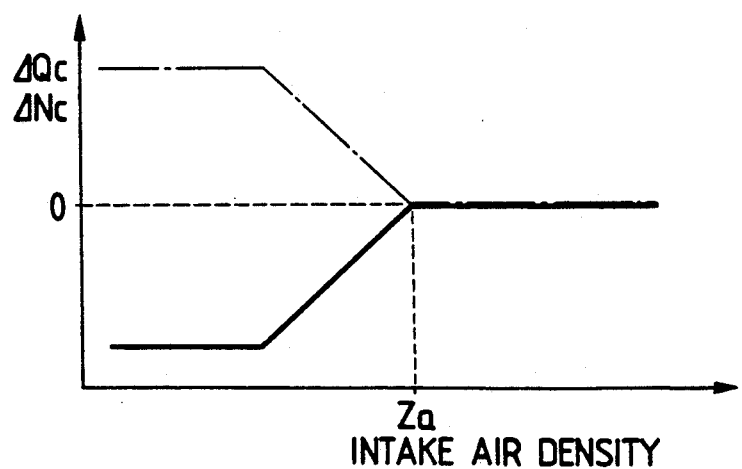

In more detail, the modifying value components $\Delta Qa$ and $\Delta Na$ are obtained by applying the slope of the road surface stored in the step 74 to a characteristic chart representing a relation between the slope of the road surface and the modifying value components $\Delta Qa$ and $\Delta Na$, as shown in FIG. 5. The characteristic chart of FIG. 5 is stored in the form of data map in the memory contained in the control unit 35. Each of the modifying value components $\Delta Qa$ and $\Delta Na$ obtained on the strength of the characteristic chart of FIG. 5 has a value of zero when the slope of the road surface is equal to or smaller in absolute value than each of a predetermined reference descent Xa and a predetermined reference to Xb, an increased positive value when the slope of the road surface is a descent larger in absolute value than the predetermined reference descent Xa, and a decreased negative value when the slope of the road surface is an ascent larger in absolute value than the predetermined reference ascent value Xb, as indicated with a solid line in the characteristic chart of FIG. 5. The modifying value components $\Delta Qb$ and $\Delta Nb$ are obtained by applying the intake air humidity stored in the step 75 to a characteristic chart representing a relation between the intake air humidity and the modifying value components $\Delta Qb$ and $\Delta Nb$, as shown in FIG. 6. The characteristic chart of FIG. 6 is also stored in the form of data map in the memory contained in the control unit 35. Each of the modifying value components $\Delta Qb$ and $\Delta Nb$ obtained on the strength of the characteristic chart of FIG. 6 has a value of zero when the intake air humidity is equal to or larger than a predetermined value Ya and a decreased negative value when the intake air humidity is smaller than the predetermined value Ya, as indicated with a solid line in the characteristic chart of FIG. 6. Further, the modifying value components $\Delta Qc$ and $\Delta Nc$ are obtained by applying the intake air density stored in the step 76 to a characteristic chart representing a relation between the intake air density and the modifying value components $\Delta Qc$ and $\Delta Nc$, as shown in FIG. 7. The characteristic chart of FIG. 7 is also stored in the form of data map in the memory contained in the control unit 35. Each of the modifying value components $\Delta Qc$ and $\Delta Nc$ obtained on the strength of the characteristic chart of FIG. 7 has a value of zero when the intake air density is equal to or larger than a predetermined value Za and a decreased negative value when the intake air density is smaller than the predetermined value Za, as indicated with a solid line in the characteristic chart of FIG. 7, or a value of zero when the intake air density is equal to or larger than the predetermined value Za and an increased positive value when the intake air density is smaller than the predetermined value Za, as indicated with a dot-dash line in the characteristic chart of FIG. 7.

Next, the modifying value components $\Delta Qa$, $\Delta Qb$ and $\Delta Qc$ are summed up to produce the modifying value $\Delta Q$, and similarly the modifying value components $\Delta Na$, $\Delta Nb$ and $\Delta Nc$ are summed up to produce the modifying value $\Delta N$.

Then, in step 78, the intake air flows Q1, Q2, Q3 and Q4 and the engine speeds N1, N2, N3 and N4 stored in the step 73 are modified respectively to shift the lines L1 to L4 on the characteristic chart of FIG. 3 in accordance with the slope of the road surface stored in the step 74, the intake air humidity stored in the step 75 and the intake air density stored in the step 76. The modifications of the intake air flows Q1 to Q4 are performed by subtracting the modifying value ΔQ calculated in the step 77 from each of the intake air flows Q1, Q2, Q3 and Q4, and the modifications of the engine speeds N1 to N4 are performed by the predetermined modifying value ΔN calculated in the step 77 from each of the engine speeds N1, N2, N3 and N4.

After that, in step 79, it is checked whether the flag F1 is 1 or not. When the flag F1 is 1, it is checked whether intake air flow Q represented by the detection output signal Sa from the air flow sensor 4 is larger then the intake air flow Q2 or not, in step 80. If the intake air flow Q is equal to or smaller than the intake air flow Q2, it is checked whether engine speed N represented by the detection output signal Sn from the engine speed sensor 61 is higher than the engine speed N2 or not, in step 81.

When it is clarified in the step 80 that the intake air flow Q is larger than the intake air flow Q2 or it is clarified in the step 81 that the engine speed N is higher than the engine speed N2, the flag F2 is set to be 1 in step 82, and the control signal E1 is supplied to the three-way solenoid valve 31 so that the intake air relief valve 23 is closed, in step 83, then the process returns to the step 72. On the other hand, if the engine speed N is equal to or lower than the engine speed N2 as a result of the check in the step 81, the process returns to the step 72 directly from the step 81.

If it is clarified in the step 79 that the flag F1 is 0, it is checked whether the flag F2 or F4 is 1 or not in step 84. When the flag F2 or F4 is 1, it is further checked whether the flag F2 is 1 or not in step 85. Then, if the flag F2 is 1, it is checked whether the intake air flow Q is larger than the intake air flow Q4 or not, in step 86. If the intake air flow Q is equal to or smaller than the intake air flow Q4, it is checked whether the engine speed N is higher than the engine speed N4 or not, in step 87.

When it is clarified in the step 86 that the intake air flow Q is larger than the intake air flow Q4 or it is clarified in the step 87 that the engine speed N is higher than the engine speed N4, the flag F4 is set to be 1 in step 88, and the control signal E2 is supplied to the three-way solenoid valve 29 so that the exhaust cutoff valve 11 is opened, in step 89, then the process returns to the step 72.

On the other hand, if the engine speed N is equal to or lower than the engine speed N4 as a result of the check in the step 87, it is checked whether the intake air flow Q is smaller than the intake air flow Q1 or not, in step 90. If the intake air flow Q is smaller than the intake air flow Q1, it is further checked that the engine speed N is lower than the engine speed N1 or not, in step 91. When it is clarified in the step 90 that the intake air flow Q is equal to or larger than the intake air flow Q1 or it is clarified in the step 91 that the engine speed N is equal to or higher than the engine speed N1, the process returns to the step 72. On the other hand, if the engine speed N is lower than the engine speed N1 as a result of the check in the step 91, the flag F1 is set to be 1 in step 92, and the control signal E1 is supplied to the three-way solenoid valve 31 so that the intake air relief valve 23 is opened, in step 93, then the process returns to the step 72.

When it is clarified in the step 85 that the flag F2 is 0, it is checked whether the intake air flow Q is smaller than the intake air flow Q1 or not, in step 94. If the intake air flow Q is smaller than the intake air flow Q1, it is checked whether the engine speed N is lower than the engine speed N1 or not, in step 95. The engine speed N is lower than the engine speed N1, the flag F1 is set to be 1 in step 96, and the control signal E1 is supplied to the three-way solenoid valve 31 so that the intake air relief valve 23 is opened, in step 97, then the process returns to the step 72.

When it is clarified in the step 94 that the intake air flow Q is equal to or larger than the intake air flow Q1 or it is clarified in the step 95 that the engine speed N is equal to or higher than the engine speed N1, it is further checked that the intake air flow Q is larger then the intake air flow Q4 or not, in step 98. If the intake air flow Q is equal to or smaller than the intake air flow Q4, it is further checked whether the engine speed N is higher than the engine speed N4 or not, in step 99. When the engine speed N is equal to or lower than the engine speed N4, the process returns to the step 72.

If it is clarified in the step 98 that the intake air flow Q is larger than the intake air flow Q4 or it is clarified in the step 99 that the engine speed N is higher than the engine speed N4, the flag F4 is set to be 1 in step 100, and the control signal E2 is supplied to the three-way solenoid valve 29 so that the exhaust cutoff valve 11 is opened, in step 101, then the process returns to the step 72.

When it is clarified in the step 84 that the flag F2 and F4 is 0, it is checked whether the intake air flow Q is smaller than the intake air flow Q3 or not, in step 102. If the intake air flow Q is smaller than the intake air flow Q3, it is checked whether the engine speed N is lower than the engine speed N3 or not, in step 103. The engine speed N is lower than the engine speed N3, the flag F3 is set to be 1 in step 104, and the control signal E2 is supplied to the three-way solenoid valve 29 so that the exhaust cutoff valve 11 is closed, in step 105, then the process returns to the step 72. If it is clarified in the step 102 that the intake air flow Q is equal to or larger than the intake air flow Q3 or it is clarified in the step 103 that the engine speed N is equal to or higher than the engine speed N3, the process returns directly to the step 72.

Figure 8:
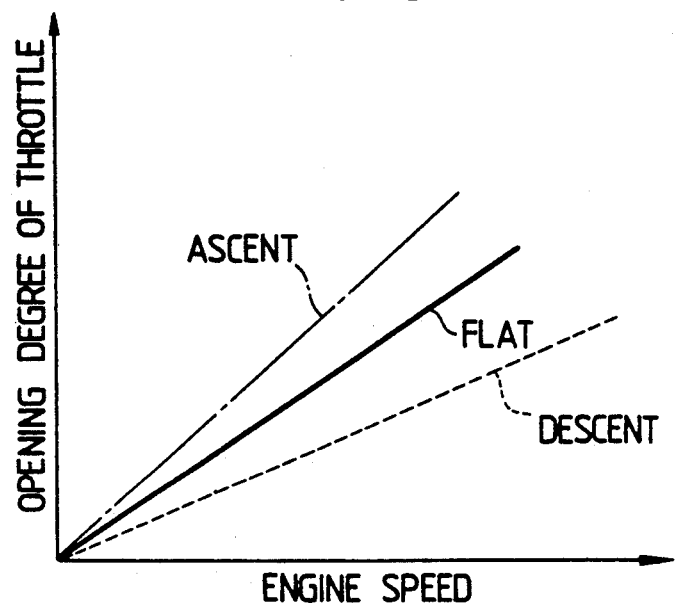

In the control as described above, the lines L1 to L4 on the characteristic chart of FIG. 3 are shifted to extend or narrow the two-charger operating area provided on the characteristic chart of FIG. 3 in accordance with the slope of the road surface detected by the slope sensor 63, so that improved supercharging efficiency is maintained regardless of variations in the slope of the road surface detected by the slope sensor 63, with which an engine speed—opening degree of throttle characteristic of the engine 1 is varied as shown in FIG. 8.

FIG. 8 shows a relation between the engine speed and the opening degree of throttle under each of conditions in which the flat, ascent larger in absolute value than the predetermined reference ascent Xb and descent larger in absolute value than the predetermined reference descent Xa are detected by the slope sensor 63, respectively. According to FIG. 8, the engine speed is increased in proportion to increase of the opening degree of throttle in such a manner as indicated by a solid line when the flat is detected by the slope sensor 63 and it is understood that a ratio of increase of the engine speed in proportion to increase of the opening degree of throttle is reduced to be smaller than that shown by the solid line as indicated by a dot-dash line when the ascent larger in absolute value than the predetermined reference ascent Xb is detected by the slope sensor 63 and is increased to be larger than that shown by the solid line as indicated by a broken line when the descent larger in absolute value than the predetermined reference descent Xa is detected by the slope sensor 63.

Figure 9:
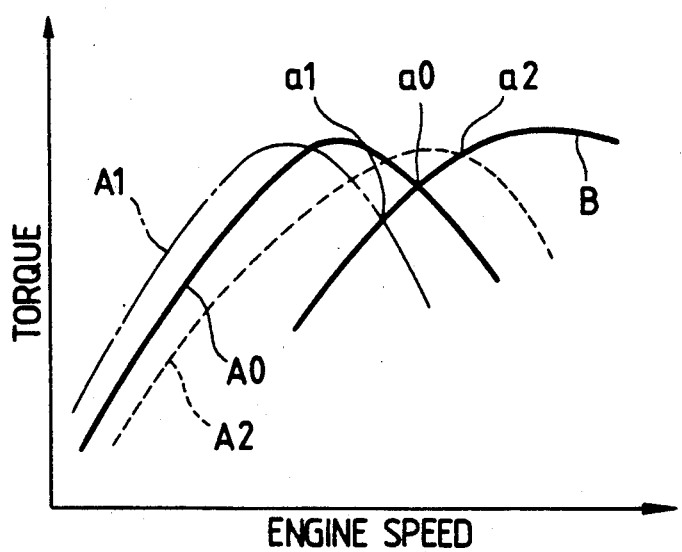

FIG. 9 shows a relation between the engine speed and torque produced by the engine 1 operating with a certain constant load under each of conditions in which the flat, ascent larger in absolute value than the predetermined reference ascent Xb and descent larger in absolute value than the predetermined reference descent Xa are detected by the slope sensor 63, respectively. In FIG. 9, a solid line A0, dot-dash line A1 and broken line A2 indicate torque curves obtained under an operating condition in which the engine 1 is supercharged by only the primary turbosupercharger 9 when the flat is detected by the slope sensor 63, an operating condition in which the engine 1 is supercharged by only the primary turbosupercharger 9 when the ascent larger in absolute value than the predetermined reference ascent Xb is detected by the slope sensor 63, and an operating condition in which the engine 1 is supercharged by only the primary turbosupercharger 9 when the descent larger in absolute value than the predetermined reference descent Xa is detected by the slope sensor 63, respectively, and a solid line B indicates a torque curve obtained under an operating condition in which the engine 1 is supercharged by both the primary and secondary turbosuperchargers 9 and 10. According to FIG. 9, in the case where the engine 1 is supercharged by only the primary turbosupercharger 9, a peak point on the dot-dash line A1 corresponding to the ascent is obtained at an engine speed lower than an engine speed at which a peak point on the solid line A0 corresponding to the flat is obtained, and a peak point on the broken line A2 corresponding to the descent is obtained at an engine speed lower than the engine speed at which the peak point on the solid line A0 corresponding to the flat is obtained. This results from the differences among the ratios of increase of the engine speed obtained on the occasion of the flat, ascent larger in absolute value than the predetermined reference ascent Xb and descent larger in absolute value than the predetermined reference descent Xa, respectively, as shown in FIG. 8.

It is to be understood from FIG. 9 that the boundary between the single-charger operating area, which corresponds to the operating condition of the engine 1 wherein the engine 1 is supercharged by only the primary turbosuperchargers 9, and the two-charger operating area, which corresponds to the operating condition of the engine 1 wherein the engine 1 is supercharged by both the primary and secondary turbosuperchargers 9 and 10, on the characteristic chart of FIG. 3, is to be set to correspond to a crossing a0 of the solid line A0 and the solid line B when the flat is detected by the slope sensor 63, to to a crossing a1 of the dot-dash line A1 and the solid line B when the ascent larger in absolute value than the predetermined reference ascent Xb is detected by the slope sensor 63, and to correspond to a crossing a2 of the broken line A2 and the solid line B when the decent larger in absolute value than the predetermined reference descent Xa is detected by the slope sensor 63, in view of obtaining improved supercharging efficiency. Accordingly, in the embodiment as described above, the lines L1 to L4 on the characteristic chart of FIG. 3 are shifted so that the boundary between the single-charger operating area and the two-charger operating area on the characteristic chart of FIG. 3 is set to correspond selectively to each of the crossings a0, a1 and a2.

Further, in the control as described above, the lines L1 to L4 on the characteristic chart of FIG. 3 are shifted to narrow the single-charger operating area provided on the characteristic chart of FIG. 3 when the intake air humidity detected by the humidity sensor 65 is lower than the predetermined value Ya and shifted also to narrow or extend the single-charger operating area provided on the characteristic chart of FIG. 3 when the intake air density detected by the density sensor 64 is lower than the predetermined value Za. This means that the single-charger operating area, which corresponds to the operating condition of the engine 1 wherein the engine 1 is supercharged by only the primary turbosuperchargers 9, is narrowed when the knocking is apt to arise in the engine 1 and the single-charger operating area is narrowed or extended when it is hard to increase intake air flow supplied to the combustion chamber in the engine 1. Consequently, improved supercharging efficiency is maintained regardless of variations in the intake air humidity detected by the humidity sensor 65 and variations in the intake air density detected by the density sensor 64. Especially, in the case where the single-charger operating area is extended when the intake air density detected by the density sensor 64 is lower than the predetermined value Za and therefore it is hard to increase intake air flow supplied to the combustion chamber in the engine 1, a period of time in which the secondary turbosupercharger 10 is subjected to its preliminary rotation before the exhaust cutoff valve 11 is opened is extended, so that the second turbosupercharger 10 under sufficiently high preliminary rotation commences to work for supercharging the engine 1 and therefore torque shock arising on the engine 1 is surely suppressed when the second turbosupercharger 10 commences to work for supercharging the engine 1.

Although the primary and secondary turbosuperchargers 9 and 10 are employed in the embodiment shown in FIG. 2, it is possible to use a supercharger other than a turbosupercharger in place of the primary turbosupercharger 9, and further it is also possible to use a single turbosupercharger which is arranged to be able to vary its charging capacity in place of both the primary and secondary turbosuperchargers 9 and 10 to constitute an example of the air supply control system according to the present invention.

What is claimed is:

1. An air supply control system for an internal combustion engine comprising:
   supercharging means provided for supercharging the engine and operative to perform selectively a first supercharging operation under a first condition wherein the engine operates with relatively small intake air flow and a second supercharging operation under a second condition wherein the engine operates with relatively large intake air flow,
   operation detecting means for detecting parameters representative of the intake air flow fed into the engine, traveling condition detecting means for detecting traveling conditions of a vehicle equipped with the engine, said traveling conditions causing a change in output of the engine, supercharging operation control means operative to cause said supercharging means to perform said first supercharging operation when the first condition is detected by said operation detecting means and to perform said second supercharging operation when the second condition is detected by said operation detecting means, and operating area changing means operative to vary, in response to the traveling conditions detected by said traveling condition detecting means, the parameters representative of the intake air flow at which a change occurs from the first supercharging operation to the second supercharging operation.

2. An air supply control system according to claim 1, wherein said first and second supercharging conditions are defined on an operating characteristic chart which shows first and second operating areas on a coordinate plane defined by coordinate axes representing respectively engine speed and engine load.

3. An air supply control system according to claim 2, wherein said coordinate axes of the operating characteristic chart include an axis of abscissa representing the engine speed and an axis of ordinate representing the engine load.

4. An air supply control system according to claim 2, wherein said traveling condition detecting means detects the traveling condition from a group including a slope of a road surface on which the vehicle travels, intake air humidity in the engine and intake air density in the engine.

5. An air supply control system according to claim 2, wherein said traveling condition detecting means is arranged to detect the slope of the road surface, and said operating area changing means is operative to vary the boundary between said first and second operating areas so as to extend said second operating area when an ascent larger in absolute value than a predetermined reference ascent is detected by said traveling condition detecting means and to narrow said second operating area when a descent larger in absolute value than a predetermined reference descent is detected by said traveling condition detecting means.

6. An air supply control system for an internal combustion engine comprising:

first and second superchargers operative to be selectively situated in a first supercharging condition wherein only the first supercharger works for supercharging the engine and in a second supercharging condition wherein both the first and second superchargers work simultaneously for supercharging the engine, operation detecting means for detecting parameters representative of intake air flow fed into the engine, traveling condition detecting means for detecting traveling conditions of a vehicle equipped with the engine, said traveling conditions causing a change in output of the engine, supercharging operation control means operative to cause said first and second superchargers to be situated in said first supercharging condition when a first engine operation attended with relatively small intake air flow is detected by said operation detecting means and to cause said first and second superchargers to be situated in said second supercharging condition when a second engine operation attended with relatively large intake air flow is detected by said operation detecting means, and operating area changing means operative to vary, in response to the traveling condition detected by said traveling condition detecting means the parameters representative of the intake air flow at which a change occurs from the first supercharging condition to the second supercharging condition.

7. An air supply control system according to claim 6, wherein said first and second supercharging conditions are defined on an operating characteristic chart which shows first and second areas on a coordinate plane defined by coordinate axes representing respectively engine speed and engine load.

8. An air supply control system according to claim 7, wherein said coordinate axes of the operating characteristic chart include an axis of abscissa representing the engine speed and an axis of ordinate representing the engine load.

9. An air supply control system according to claim 8, wherein said engine load defining the coordinate plane shown by the operating characteristic chart is embodied by opening degree of throttle in the engine.

10. An air supply control system according to claim 6, wherein said traveling condition detecting means is arranged to detect slope of a road surface on which the vehicle travels and said operating area changing means operates to vary the boundary between said first and second operating areas so as to extend said second operating area when an ascent larger in absolute value than a predetermined reference ascent is detected by said traveling condition detecting means and to narrow said second operating area when a descent larger in absolute value than a predetermined reference descent is detected by said traveling condition detecting means.

11. An air supply control system according to claim 6, wherein said traveling condition detecting means is arranged to detect intake air humidity in the engine and said operating area changing means operates to vary the boundary between said first and second operating areas so as to extend said second operating area when air intake humidity in the engine detected by said traveling condition detecting means is lower than a predetermined reference value.

12. An air supply control system according to claim 6, wherein said traveling condition detecting means is arranged to detect intake air density in the engine and said operating area changing means operates to vary the boundary between said first and second operating areas so as to extend said second operating area when air intake density in the engine detected by said traveling condition detecting means is lower than a predetermined reference value.

13. An air supply control system according to claim 6, wherein said traveling condition detecting means is arranged to detect intake air density in the engine and said operating area changing means operates to vary the boundary between said first and second operating areas so as to narrow said second operating area when air intake density in the engine detected by said traveling condition detecting means is lower than a predetermined reference value.

14. An air supply control system according to claim 6, wherein said second supercharger is constituted as a turbosupercharger having a turbine disposed in one of separated exhaust passages connected with the engine and a blower connected through a shaft with the turbine and disposed in one of separated intake passages connected with the engine, and said supercharging operation control means comprises an exhaust cutoff valve operative to be closed for closing said one of separated exhaust passages when said first engine operation is detected by said operation detecting means and to be open for opening said one of separated exhaust passages when said second engine operation is detected by said operation detecting means.

15. An air supply control system according to claim 14, wherein said supercharging operation control means further comprises an intake air relief valve operative to be closed for closing an air relief passage provided to said one of separated intake passages so as to detour said blower at a time point not later than another time point at which said exhaust cutoff valve is fully opened.

* * * * *